United States Patent
Pegouet

(10) Patent No.: US 8,894,360 B2
(45) Date of Patent: Nov. 25, 2014

(54) TURBOMACHINE COMPRESSOR ROTOR INCLUDING CENTRIPETAL AIR BLEED MEANS

(75) Inventor: Benjamin Philippe Pierre Pegouet, Melun (FR)

(73) Assignee: SNECMA, Paris (FR)

( * ) Notice: Subject to any disclaimer, the term of this patent is extended or adjusted under 35 U.S.C. 154(b) by 1067 days.

(21) Appl. No.: 12/988,176

(22) PCT Filed: Apr. 20, 2009

(86) PCT No.: PCT/FR2009/000462
§ 371 (c)(1), (2), (4) Date: Oct. 25, 2010

(87) PCT Pub. No.: WO2009/138581
PCT Pub. Date: Nov. 19, 2009

(65) Prior Publication Data
US 2011/0033303 A1  Feb. 10, 2011

(30) Foreign Application Priority Data

Apr. 24, 2008  (FR) ..................... 08 02296

(51) Int. Cl.
| | | |
|---|---|---|
| F01D 13/02 | (2006.01) | |
| F04D 27/02 | (2006.01) | |
| F02C 6/08 | (2006.01) | |
| F04D 29/58 | (2006.01) | |
| F04D 29/54 | (2006.01) | |

(52) U.S. Cl.
CPC ............ *F02C 6/08* (2013.01); *F05D 2260/231* (2013.01); *F04D 27/0215* (2013.01); *F05D 2240/61* (2013.01); *F04D 29/584* (2013.01); *Y02T 50/675* (2013.01); *F04D 29/541* (2013.01)

USPC .......................................... 415/144

(58) Field of Classification Search
USPC ................. 416/90 R; 415/120, 144, 168.1
See application file for complete search history.

(56) References Cited

U.S. PATENT DOCUMENTS

| | | | |
|---|---|---|---|
| 3,085,400 A | 4/1963 | Sonder et al. | |
| 4,231,704 A | 11/1980 | Ayache et al. | |
| 4,919,590 A * | 4/1990 | Stratford et al. | 415/116 |

(Continued)

FOREIGN PATENT DOCUMENTS

| | | |
|---|---|---|
| EP | 1 329 591 | 7/2003 |
| FR | 2 672 943 | 8/1992 |

(Continued)

OTHER PUBLICATIONS

International Search Report issued Nov. 26, 2009 in PCT/FR09/00462 filed Apr. 20, 2009.

(Continued)

*Primary Examiner* — Edward Look
*Assistant Examiner* — Adam W Brown
(74) *Attorney, Agent, or Firm* — Oblon, Spivak, McClelland, Maier & Neustadt, L.L.P.

(57) ABSTRACT

A turbomachine compressor rotor including at least two blade-carrying disks mounted on a common axis and connected together by a wall forming a substantially cylindrical surface of revolution, and a centripetal air bleed mechanism including air passages passing through the wall and radial fins for deflecting a stream of air leaving the passages in the wall, the fins being carried by one of the disks and being substantially in radial alignment with the passages through the wall.

16 Claims, 3 Drawing Sheets

(56) References Cited

U.S. PATENT DOCUMENTS

| | | | |
|---|---|---|---|
| 5,997,244 A * | 12/1999 | Gebre-Giorgis et al. | 415/115 |
| 6,966,191 B2 | 11/2005 | Fukutani et al. | |
| 7,390,167 B1 | 6/2008 | Bouiller et al. | |
| 7,624,580 B2 | 12/2009 | Fukutani | |
| 2003/0133788 A1 * | 7/2003 | Avignon et al. | 415/115 |

FOREIGN PATENT DOCUMENTS

| | | |
|---|---|---|
| FR | 2672943 A1 * | 8/1992 |
| JP | 2004-346786 | 12/2004 |
| JP | 2006-220016 | 8/2006 |
| JP | 2007-40305 | 2/2007 |
| RU | 2003-104040 | 9/2004 |
| RU | 2 364 727 | 8/2009 |
| RU | 2 419 724 | 5/2011 |

OTHER PUBLICATIONS

U.S. Appl. No. 12/989,497, filed Oct. 25, 2010, Behaghel, et al.

* cited by examiner

TURBOMACHINE COMPRESSOR ROTOR INCLUDING CENTRIPETAL AIR BLEED MEANS

BACKGROUND OF THE INVENTION

1. Field of the Invention

The present invention relates to centripetal air bleed means in a compressor rotor of a turbomachine such as an airplane turboprop or turbojet.

2. Description of the Related Art

The bladed wheels of a compressor rotor are connected together by a wall forming a substantially cylindrical or frustoconical surface of revolution that extends coaxially between the disks. This wall connecting the disks together may be formed integrally with a first disk or it may be put into place and fastened at one of its axial ends on a lateral face of the first disk, and its opposite axial end may include an annular flange fastened by nut-and-bolt type means to a second disk.

It is known to fit the rotor with centripetal-flow air bleed means for feeding systems for ventilating and/or cooling downstream stages of the compressor and turbine rims of the turbomachine, and also for purging the turbomachine.

In the prior art, these bleed means comprise passages formed through the wall connecting together the compressor disks and opening out into an annular chamber formed inside the wall between two rotor disks.

A portion of the air flowing in the flow section of the compressor is bled off via the through passages in the wall connecting the disks together, and it passes into the annular chamber where it flows centripetally along the disks of the rotor, and then flows from upstream to downstream inside the turbomachine and outside an axial cylindrical sheath, in order to reach the turbine. However, turbulence and head losses in the center of the annular chamber between the rotor disks are considerable, which leads to air being bled from a downstream stage of the compressor and therefore leads to an increase in the specific consumption of the turbomachine.

Furthermore, the bleed air is heated because of its high speed of rotation compared with that of the disks. When the air entrainment coefficient Ke (which is equal to the ratio of the tangential speed of the bleed air flowing in the compressor divided by the speed of rotation of the rotor of the turbomachine compressor) is greater than 1, it is necessary to increase the flow rate of the bleed air in order to ensure proper cooling of the components of the turbine. However, in certain zones, in particular in the interdisk chamber and in the vicinity of the cylindrical sheath, the coefficient Ke may be as high as 2.5 in the prior art.

In order to reduce that drawback, proposals have already been made to reduce the speed of the air in the interdisk chamber by means of substantially radial fins arranged on the facing faces of the disks that define the chamber. Nevertheless, such fins do not enable head losses to be reduced in the central zone of the chamber.

BRIEF SUMMARY OF THE INVENTION

A particular object of the invention is to provide a solution to those problems of the prior art that is simpler, more effective, and less expensive.

To this end, the invention provides a turbomachine compressor rotor, comprising at least two blade-carrying disks on a common axis and connected together by a coaxial wall forming a substantially cylindrical surface of revolution, and centripetal air bleed means comprising both air passages passing through the wall and opening out into an annular chamber formed inside the wall and between the disks, and also substantially radial fins carried by one of the disks, the rotor being characterized in that the fins are axially spaced apart from the disks and are substantially in radial alignment with the passages through the wall, said fins being connected solely at one of their axial ends to support means that are fastened to the disk.

According to the invention, the fins deflect the bleed air stream as soon as it leaves the passages through the wall interconnecting the disks. The fins extend in the central zone of the chamber, thereby serving to limit eddies and turbulence in this zone by forcing the air to flow centripetally. The invention thus makes it possible to avoid breaking up the air jets leaving the through passages and to avoid forming turbulence that generates head losses. Because of this reduction in head losses, it is possible to envisage bleeding air from a stage of the compressor that is further upstream, thereby enabling the specific consumption of the turbomachine to be reduced, and also reducing the temperature of the bleed air. The fins rotate at the same speed of rotation as the compressor rotor and they also limit the increase in the speed of the bleed air compared with that of the rotor (Ke=1). The air that reaches the radial faces of the disks flows naturally along the disks towards the axis of rotation by forming layers on said disk of a kind that also occur as atmospheric or oceanic phenomena and that are known as Ekman layers.

Furthermore, according to a characteristic of the invention, the fins are connected via one of their axial ends to support means that are fastened to one of the disks, with each of the fins thus having one of its axial ends free.

The air passages may be formed through the wall forming a surface of revolution downstream from a labyrinth seal that co-operates with a nozzle mounted between the two rotor disks. The fins may be carried by the downstream disks defining the chamber.

Preferably, the deflector fins are regularly distributed around the axis of the rotor and are inclined relative to the axis of the rotor.

These fins may be plane plates. In a variant they are airfoils each having a radially outer leading edge and a radially inner trailing edge.

The fins may be connected to the above-mentioned disks independently of one another. Each fin may then be formed integrally with a support element of substantially radial orientation that is fastened to the disk. In a variant, the fins are fitted and fastened to a substantially radial annular element that is in turn fastened, e.g. by nut-and-bolt type means, to an annular flange of the disk, thereby enabling the fins to be dismounted.

The fins are thus carried by at most one annular element and they are therefore not situated between two annular elements. This serves to avoid holding "captive" the air that flows between the fins, thus allowing it to have an influence on the flow of air in the vicinity of the fins. By fastening the fins to a single annular element it is possible to increase virtually the active portion of the fins (in the width direction of the fins), with the portion of the air flow that does not pass between the fins nevertheless being entrained because of viscous friction with the portion of the air flow that passes between the fins.

The radially outer ends of the fins are preferably spaced apart from the wall including the air passages by a given radial distance. The fins may extend over a portion only of the radial dimension of the disks towards the axis of rotation.

The fins present a width or an axial dimension that may be close to the diameter of the air passages through the wall forming a surface of revolution. This dimension is preferably less than half the axial distance between the disks, for example less than 30% of said distance.

The fins are thus of small width, thereby enabling the time taken to assemble the parts to be reduced and also reducing the cost and the weight of the fins.

In spite of the relatively small width of the fins of the invention, most of the bleed air flows naturally towards the fins, given that that is the preferred passage. It is the passage that presents the lowest head losses and that is thus the easiest for the flow of air to follow.

On the upstream disk that is located at a distance from the fins, the effect of the fins is lessened and low speeds of centripetal air flow or even flow-harming turbulence might be expected, however a dynamic effect created by the rotation of the rotor forms the above-mentioned Ekman layers that encourage the air to flow centripetally. Thus, in these layers, radial speeds are likewise high and they encourage centripetal flow.

The present invention also provides a turbomachine, such as an airplane turboprop or turbojet that is characterized in that it includes a compressor rotor as described above.

BRIEF DESCRIPTION OF THE SEVERAL VIEWS OF THE DRAWINGS

The present invention can be better understood and other details, characteristics, and advantages of the present invention appear more clearly on reading the following description made by way of non-limiting example and with reference to the accompanying drawings, in which.

DETAILED DESCRIPTION OF THE INVENTION

Figure 1:
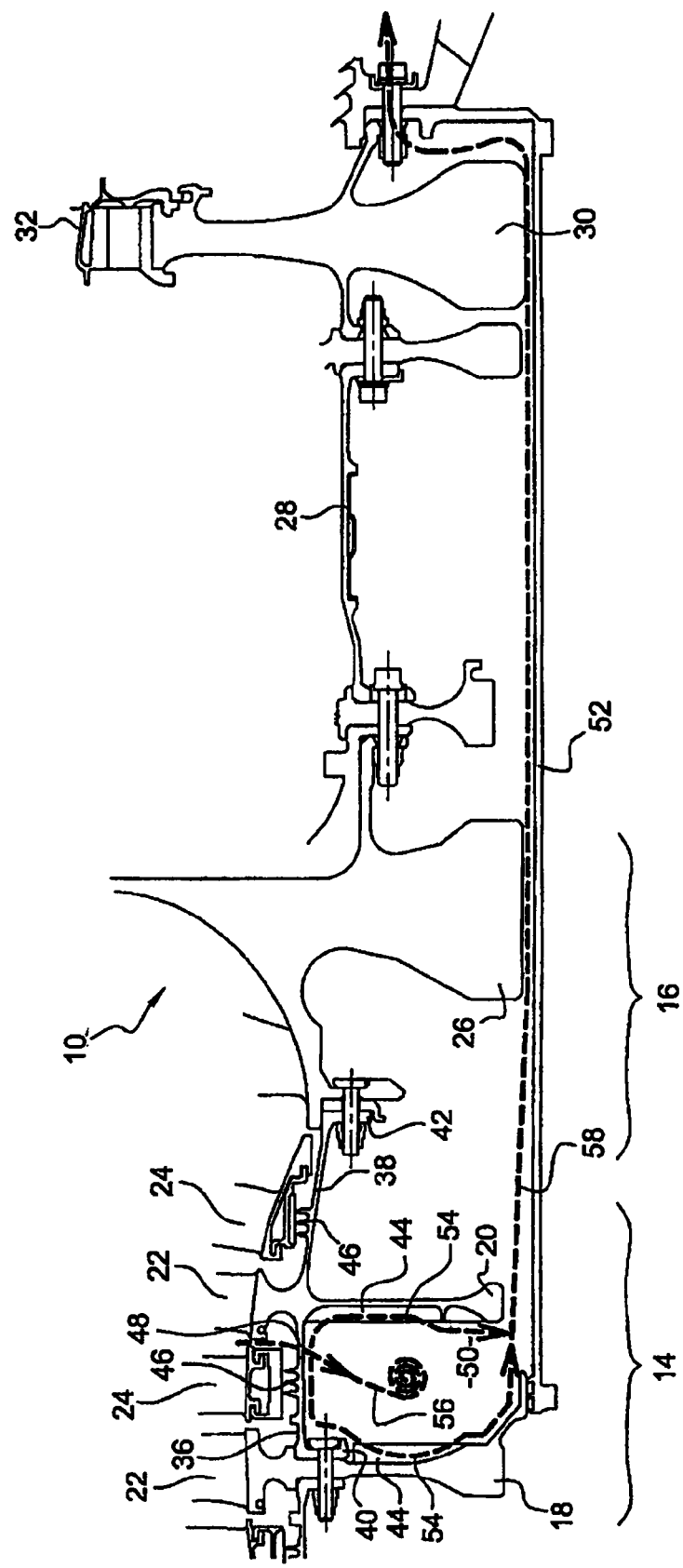
FIG. 1 is a fragmentary diagrammatic half-view in axial section of a turbomachine comprising in particular a compressor, a combustion chamber, and a turbine.

Reference is made initially to FIG. 1, which shows a portion of a turbomachine 10 fitted with centripetal air bleed means 44, 48 of the prior art.

The turbomachine comprises in particular a compressor, a combustion chamber, and a turbine. The compressor 14, 16 is shown in part and comprises an upstream module having a plurality of axial compression stages 14 and a downstream module comprising a centrifugal compression stage 16. Each axial stage 14 of the compressor comprises a rotor wheel formed by a disk 18, 20 carrying blades 22 at its outer periphery, and a nozzle 24 situated downstream from the wheel and formed by an annular row of stationary nozzle vanes.

The rotor disks 18 and 20 are mounted on an axis that is common to them and to an impeller 26 of the centrifugal stage 16 which is itself fastened via an inner cylindrical casing 28 of the combustion chamber to a rotor wheel of the turbine. The turbine wheel is formed by a rim 30 carrying blades 32 on its outer periphery.

The disks 18, 20 of the compressor rotor are connected together and to the impeller 26 by walls 36, 38 forming surfaces of revolution that are substantially cylindrical or frustoconical and that extend around the axis of rotation of the rotor.

FIG. 1 shows only two disks 18, 20 of the compressor rotor. The downstream disk 20 is formed as a single piece having a substantially cylindrical upstream wall 36 for fastening to the upstream disk 18, and with a substantially frustoconical downstream wall 38 for fastening of the impeller 26. The upstream end of the wall 26 carries an annular flange 40 that is pressed against a downstream radial face of the disk 18 and that is fastened to said disk by nut-and-bolt type means, and the downstream end 38 carries an annular flange 42 fastened by nut-and-bolt type means to the impeller 26.

In known manner, the walls 36 and 38 of the compressor rotor carry outer annular wipers 46 that co-operate by rubbing against elements made of abradable material that are carried by the nozzles 24 in order to form labyrinth type seals.

The centripetal air bleed means are mounted between the rotor disks of two consecutive stages of the compressor of the turbomachine. In the example shown, these means are provided between the disks 18 and 20 and they comprise radial passages 48 formed through the wall 36 of the disk 30 and opening out into an annular chamber 50 defined by the disks 18 and 20 and by the wall 36 connecting these disks together. The bleed means also comprise two annular rows of fins 44 that extend substantially radially inside the chamber 50 and that are formed integrally with the disks 18 and 20. The fins 44 are formed on the facing side faces of the disks and they extend over a major portion of the radial dimension thereof.

A portion of the air flowing in the flow section of the compressor passes radially from the outside towards the inside via the passages 48 in the wall 36 and penetrates into the annular chamber 50. A portion of this air comes up to the facing faces of the disks 18 and 20 and naturally flows along the disks towards the axis of rotation (dashed lines 54). The remainder of the air reaches the center of the chamber in a zone where there is a large amount of eddies and turbulence (dashed lines 56). The air that leaves the chamber 50 is then guided axially from upstream to downstream around a cylindrical sheath 52 that extends coaxially inside the disks 18, 20 and the impeller 26 of the compressor and the rim 30 of the turbine. The air flows axially as far as the turbine and may serve to feed systems for cooling and/or ventilating components of the turbine (dashed lines 58).

The air that flows naturally in centripetal manner along the disks 18, 20 is constrained by the fins to rotate at substantially the same speed as the compressor rotor (Ke=1). Nevertheless, these fins do not serve to direct or slow down the air in the central zone of the chamber 50 where head losses are high.

The invention serves to remedy these problems at least in part by means of deflector fins that are axially offset from the disks 18, 20 of the rotor and that are in radial alignment with the air passages 48 in the wall connecting these disks together.

The invention makes it possible significantly to reduce head losses in the bleed air stream and to envisage bleeding air from further upstream along the compressor so as to limit the specific consumption of the turbomachine.

Figure 2:
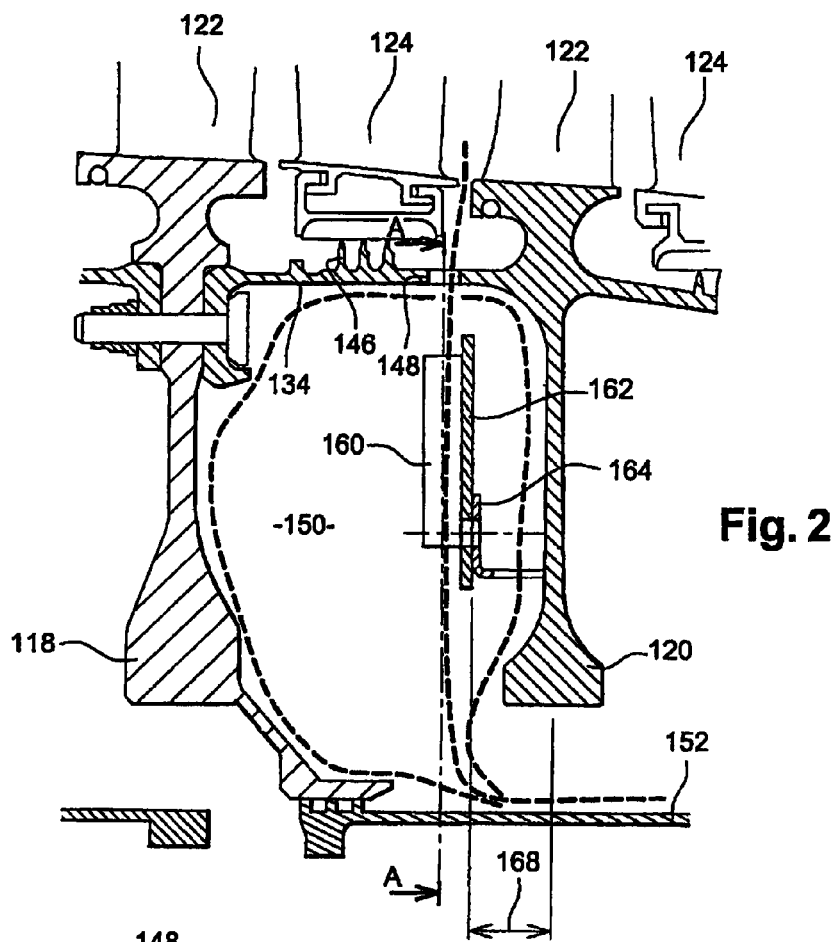
FIG. 2 is a fragmentary diagrammatic half-view in axial section and on a larger scale than FIG. 1 showing a compressor rotor fitted with centripetal air bleed means of the invention.
Figure 3:
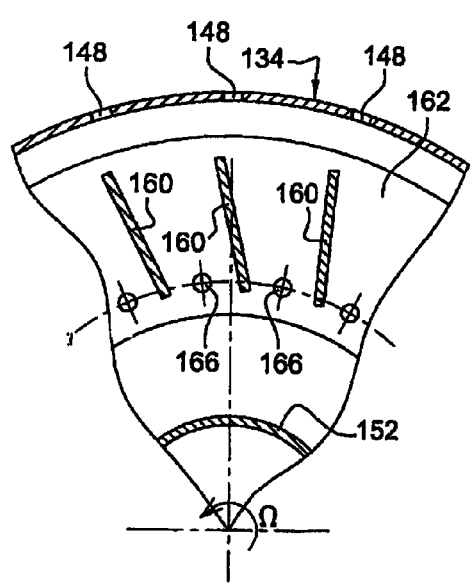
FIG. 3 is a section view on line A-A of FIG. 2.

In the example shown in FIGS. 2 and 3, elements described above with reference to FIG. 1 are designated by the same numbers plus one hundred.

Here the deflector fins 160 are formed by plane plates that are carried by an annular element 162 that is itself fastened by nut-and-bolt type means or the like to an annular flange 164 of the downstream disk 120. The annular element 162 is formed by a wall that is substantially radial in the example shown.

The fins 160 are regularly distributed around the axis of the rotor and each of them is slightly inclined relative to a radius passing through said axis (FIG. 3) so as to create an effect of sucking the air stream inwards while in operation. The fins 160 are fitted on a face of the annular element 162, its upstream face in the example shown, and they are fastened thereto by brazing or by welding, for example.

The fins 160 extend over a fraction only of the radial dimension of the wall of the disk 120 carrying the fins. The radially inner and outer ends of the fins 160 are at a radial distance from the inner and outer peripheral edges of the annular wall 162. The fins 160 are also spaced apart at a given radial distance from the wall 136 connecting the disks together.

The annular element 162 may be sectorized or it may be continuous over 360°. This element forms complementary guide means for the air stream leaving the passages 148 in the wall 136.

The element 162 has an annular row of orifices 166 close to its inner peripheral edge for passing the above-mentioned nut-and-bolt type means.

The inner periphery of the element 162 is pressed against the annular flange 164 of the disk 120 which is arranged on the upstream side thereof. The flange 164 is connected to the disk by axial tabs that are spaced apart from one another so as to allow air to flow centripetally between said tabs along the disk 120, between the disk and the element 162.

The axial distance 168 between the element 162 and the disk 120 is determined so that the fins 160 are substantially in radial alignment with the air outlet passages 148, as can be seen in FIG. 2.

In operation, a portion of the air leaving the passages 148 is thus sucked in by the fins 160 that rotate at the same speed as the compressor rotor and that thus serve to deflect the bleed air as soon as it leaves the openings and to reduce the speed of said air so that it does not exceed the speed of the rotor (Ke=1). The invention thus makes it possible to avoid turbulence forming in the center of the chamber 150 and thus to limit head losses in the bleed air stream. The other portion of the bleed air flows naturally along the disks 118, 120 towards the axis of the rotor, forming Ekman layers.

Figure 4:
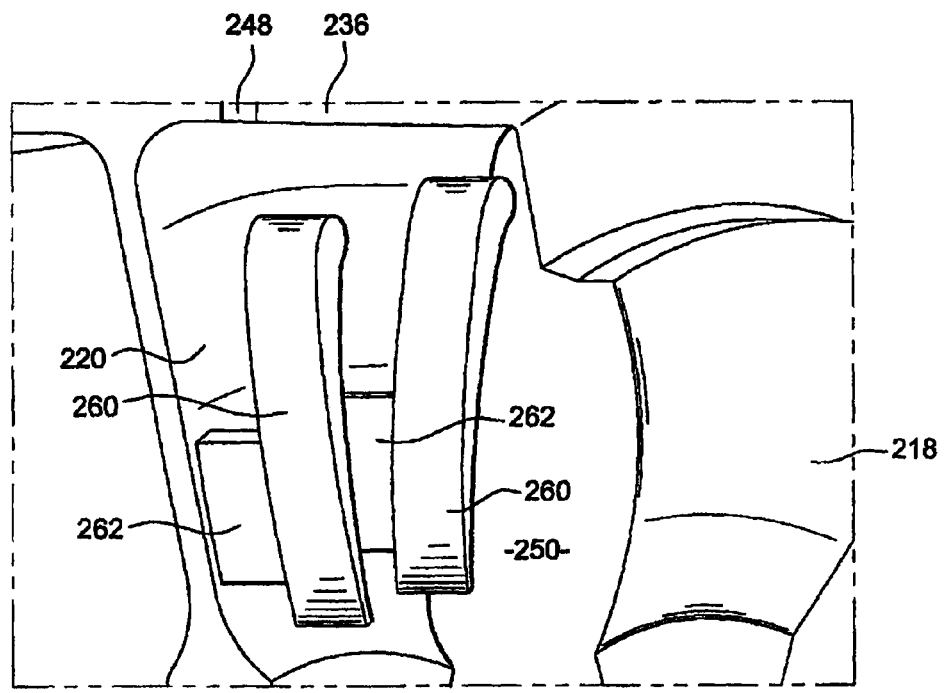
FIG. 4 is a diagrammatic perspective view of a variant embodiment of the air bleed means of the invention.

In the variant shown in FIG. 4, the fins 260 are formed by airfoils each having a leading edge and a trailing edge relative to the flow of bleed air, the leading edge being radially on the outside and the trailing edge being radially on the inside.

The fins 260 are regularly spaced apart around the axis of the rotor and they may be inclined slightly relative to said axis in order to produce the above-mentioned suction effect.

The fins 260 are connected independently of one another to the disk 220 by support members 262. In the example shown, these members 262 are formed by small substantially rectangular plates extending radially around the axis of the rotor and interposed between the fins 260 and the disk 220. Each member 262 extends over about half of the radial dimension of a fin 260. These members 262 allow air to flow centripetally between one another along the disk 220. The fins 260 are at an axial distance from the disk 220 and at a radial distance from the wall 236 so as to be placed substantially at the center of the chamber 250, and so as to be substantially in radial alignment with the air passages 248 in the wall 236.

In another variant that is not shown, the air bleed passages 148 and 248 are formed on an upstream end portion of the wall 136, 236, e.g. upstream from the wipers of said wall. In yet another variant, the deflector fins 160, 260 are carried by the upstream disk 118, 218.

The temperature of the bleed air is about 500° K and the flow rate of the bleed air is about 100 grams per second (g/s).

Figure 5:
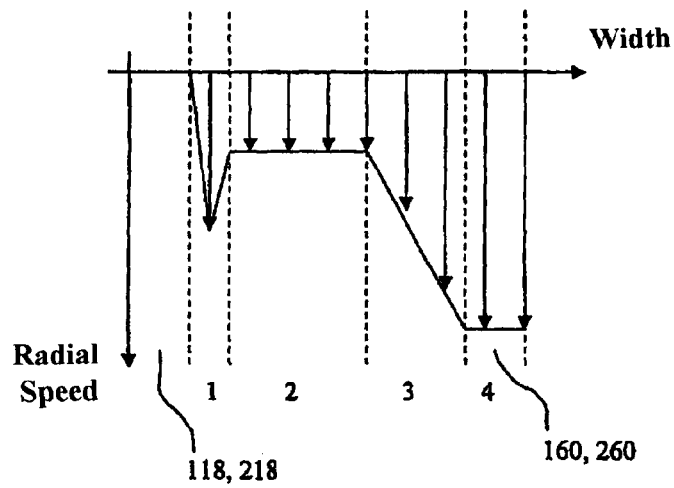
FIG. 5 is a graph plotting variation in radial air speed at a given radius in an inter-disk chamber of a compressor rotor as a function of the width or axial dimension of said chamber.

FIG. 5 shows the profile of the radial speed of the air along the width of the inter-disk chamber 150, 250 at a given radius. From left to right in the figure, there can be seen the influence of the Ekman layers on the speed of the air flowing over the upstream disk 118, 218 (zone 1), followed by a portion of smaller radial speed (zone 2), followed by progressive centripetal entrainment of the air as a result of viscous friction with the air flowing between the fins 160, 260 (zone 3), and finally greatest radial speed for the air that passes between the fins (zone 4).

The invention claimed is:

1. A turbomachine compressor rotor, comprising:
   first and second blade-carrying disks on a common axis and connected together by a coaxial wall forming a substantially cylindrical surface of revolution, the first blade-carrying disk being located upstream of the second blade-carrying disk on said common axis; and
   centripetal air bleed means comprising air passages passing through the wall and opening out into an annular chamber formed inside the wall and between the disks, and substantially radial fins carried by an annular element fixed to one of the disks and having two axial ends,
   wherein the fins are axially spaced apart from the disks and are substantially in radial alignment with the passages through the wall, each of the fins being connected solely by one of the axial ends to a support fastened to the disk, and each of the fins has another of said axial ends being a free end which extends upstream of said one of the axial ends whereby said free end can be in contact with a first portion of said bleed air leaving the air passages while a second portion of said bleed air can flow between said annular element and the second blade-carrying disk.

2. A rotor according to claim 1, wherein the fins are regularly distributed around the axis of the rotor.

3. A rotor according to claim 1, wherein each fin is inclined relative to a radius passing through the axis of the rotor.

4. A rotor according to claim 1, wherein the fins are plane plates.

5. A rotor according to claim 1, wherein the fins are airfoils, each having a radially outer leading edge and a radially inner trailing edge.

6. A rotor according to claim 1, wherein the fins are connected to the disk independently of one another.

7. A rotor according to claim 6, wherein said annular element presents a substantially radial orientation.

8. A rotor according to claim 1, wherein the fins are fitted and fastened to said annular element that is substantially radial, and said annular element is fastened to an annular flange of the second blade-carrying disk by a nut-and-bolt type fastener.

9. A rotor according to claim 1, wherein the radially outer ends of the fins are radially spaced apart from the wall including the air passages by a given distance.

10. A rotor according to claim 1, wherein the fins extend over a fraction of the radial dimension of the disk supporting the fins.

11. A rotor according to claim 1, wherein the air passages are formed through the wall downstream from a labyrinth seal for co-operating with a nozzle mounted between the two disks of the rotor, and the fins are carried by the downstream disk defining the chamber.

12. A rotor according to claim 1, wherein the fins have an axial dimension less than half the axial distance between the disks.

13. A turbomachine, an airplane turboprop, or turbojet, comprising a rotor according to claim 1.

14. A rotor according to claim 1, wherein said free end of each of said fins extends parallel to a radial axis of the fin.

15. A turbomachine compressor rotor, comprising:
at least two blade-carrying disks on a common axis and connected together by a wall forming a substantially cylindrical surface of revolution; and
centripetal air bleed means formed apart from the disks, at an axial distance therefrom, and comprising air passages passing through the wall and opening out into an annular chamber formed inside the wall and between the disks, and substantially radial fins carried by an annular element fixed to one of the disks and having a first axial end and a second axial end,
wherein the fins are axially spaced apart from the disks and each fin in a substantially radial alignment with the corresponding passage through the wall, each of the fins being connected solely by the first axial end to support means that are fastened to the disk, so that each of the fins has the second axial end being free whereby said second axial end can be in contact with a first portion of said bleed air leaving the air passages while a second portion of said bleed air:
 can flow between the annular element of said fin and the blade-carrying disk the support means of which is fastened to, and
 can pass through said support means.

16. A rotor according to claim 15, wherein:
the rotor further comprises a nozzle formed by an annular row of stationary nozzle vanes,
the coaxial wall and the nozzle carry elements adapted to form a seal therebetween, and,
the air passages pass through the coaxial wall downstream the seal.

* * * * *